United States Patent
Richards et al.

(10) Patent No.: US 6,671,310 B1
(45) Date of Patent: Dec. 30, 2003

(54) METHOD AND APPARATUS FOR POSITIONING PULSES OVER TIME BY APPLYING TIME-HOPPING CODES HAVING PRE-DEFINED CHARACTERISTICS

(75) Inventors: James L. Richards, Fayetteville, TN (US); Mark D. Roberts, Huntsville, AL (US); Marcus H. Pendergrass, Huntsville, AL (US); Larry W. Fullerton, Brownsboro, AL (US)

(73) Assignee: Time Domain Corporation, Huntsville, AL (US)

( * ) Notice: Subject to any disclaimer, the term of this patent is extended or adjusted under 35 U.S.C. 154(b) by 696 days.

(21) Appl. No.: 09/591,690

(22) Filed: Jun. 12, 2000

(51) Int. Cl.[7] .................................................. H04B 1/69
(52) U.S. Cl. .................................................... 375/138
(58) Field of Search ................................ 375/138, 130, 375/139, 241, 242, 237, 239; 370/342, 441, 515, 335, 320

(56) References Cited

U.S. PATENT DOCUMENTS

| | | | | |
|---|---|---|---|---|
| 4,641,317 A | * | 2/1987 | Fullerton | 375/130 |
| 4,813,057 A | * | 3/1989 | Fullerton | 375/259 |
| 4,979,186 A | * | 12/1990 | Fullerton | 375/239 |
| 5,363,057 A | * | 11/1994 | Furuno | 330/129 |
| 5,610,907 A | * | 3/1997 | Barrett | 370/342 |
| 5,677,927 A | * | 10/1997 | Fullerton et al. | 375/130 |
| 5,687,169 A | * | 11/1997 | Fullerton | 370/324 |
| 5,832,035 A | * | 11/1998 | Fullerton | 375/149 |
| 6,571,099 B1 | * | 5/2003 | Kim et al. | 455/442 |

* cited by examiner

*Primary Examiner*—Khai Tran
(74) *Attorney, Agent, or Firm*—Venable LLP; Robert S. Babayi

(57) ABSTRACT

A method for positioning pulses over time (via a time layout) applies time-hopping codes having pre-defined characteristics. The time layout can be sequentially subdivided into at least first and second time components that have the same or different sizes. The method applies a first time-hopping code having first pre-defined properties to the first time component and a second time-hopping code having second pre-defined properties to the second time component. The pre-defined properties may relate to the auto-correlation property, the cross-correlation property, and spectral properties, as examples. The codes can be used to specify subcomponents within a frame, and positions (range-based, or discrete) within the subcomponents, where the pulses are positioned.

62 Claims, 15 Drawing Sheets

Time Period Discrete Value Layout Consisting of Thirty-seven Values,
$N_{discrete\ time\ values} = 37$ t(1)  202                                                              t(37)

Time Period Discrete Value Layout Consisting of Six Values,
$N_{discrete\ time\ values} = 6$ t(1)    t(2)         t(3)  t(4)      t(5)           t(6)
  204

Example 1: Sequential Combination of Two or More Repeating Codes
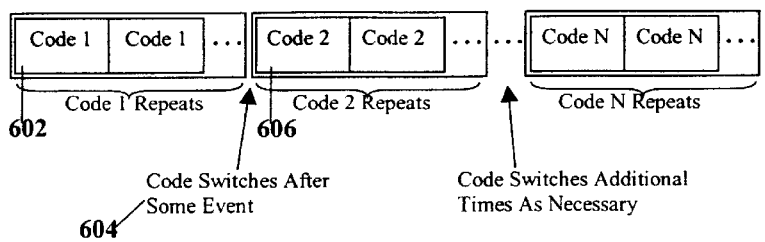
Example 2: Repeating Sequential Combination of Two or More Repeating Codes
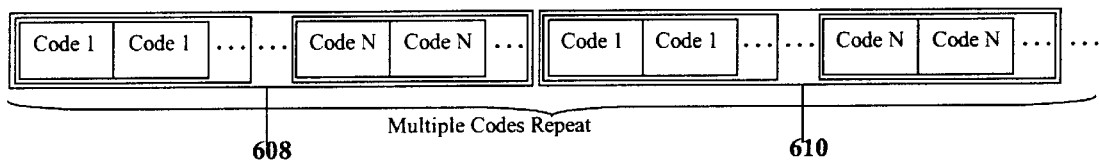
FIGURE 6.

Example 1: Mapping Sequential Combination of Two or More Repeating Same Length Codes to Repeating Layout
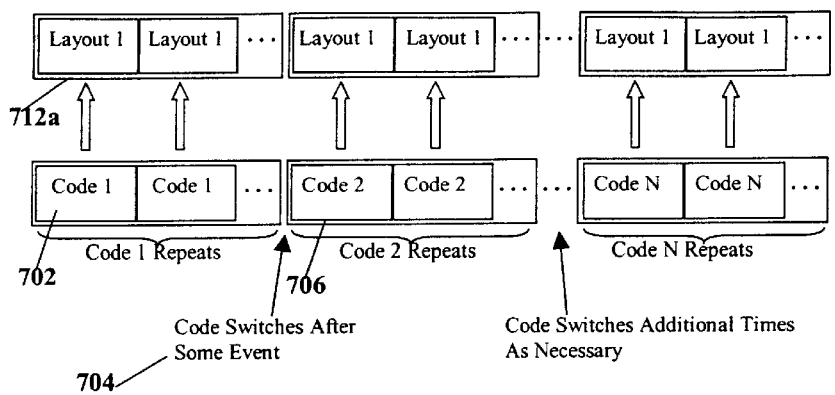
Example 2: Mapping Repeating Sequential Combination of Two or More Repeating Same Length Codes to Repeating Layout
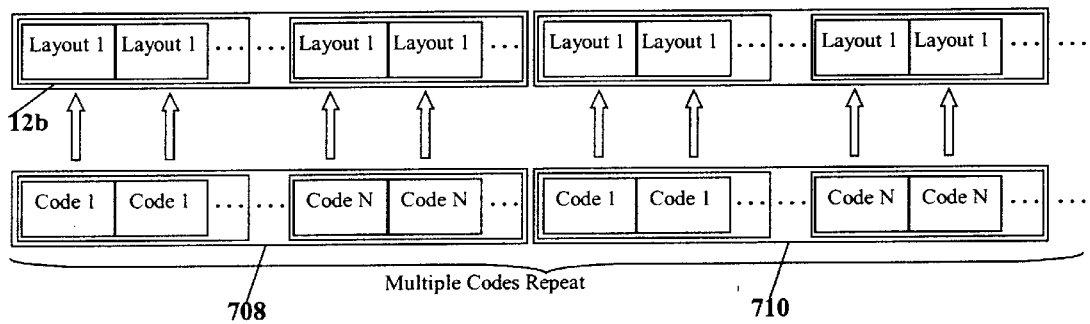
FIGURE 7a

Example 1: Mapping Sequential Combination of Two or More Repeating Codes of Different Sizes to Sequential Combination of Two or More Repeating Layouts of Different Sizes

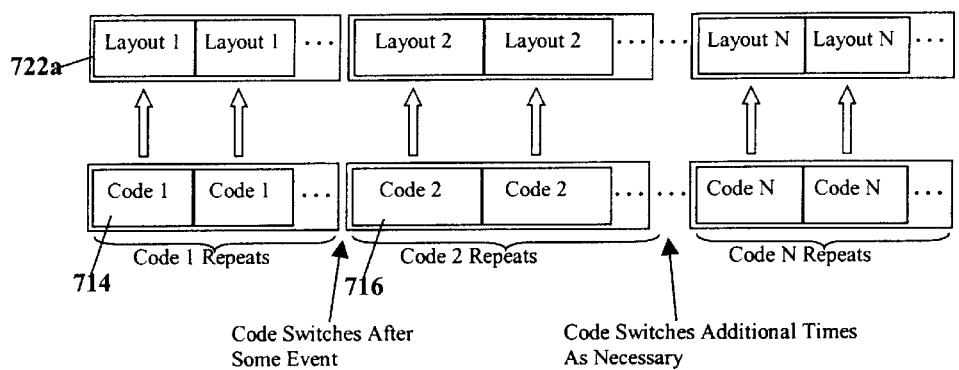

Example 2: Mapping Repeating Sequential Combination of Two or More Repeating Codes of Different Sizes to Repeating Sequential Combination of Two or More Repeating Layouts of Different Sizes

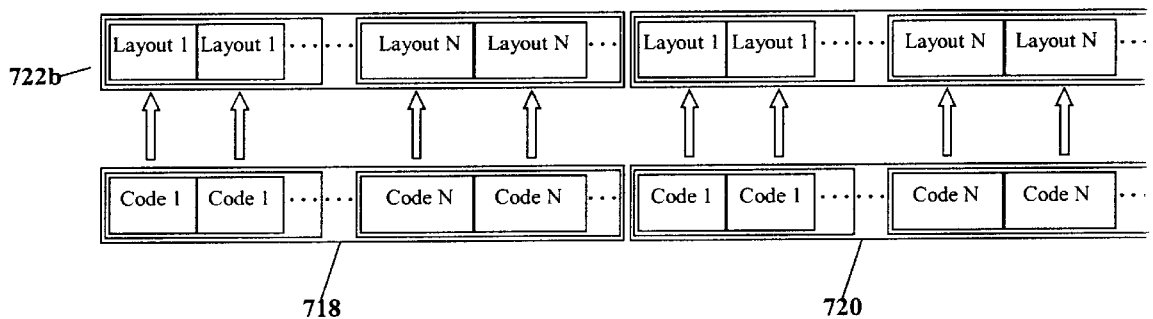

FIGURE 7b

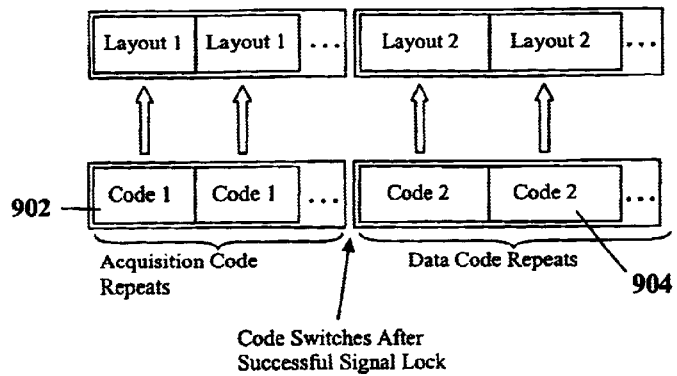
Acquisition Code
- Fast locking
- Less than ideal spectrum
Data Code
- Long lock time
- Flatter spectrum
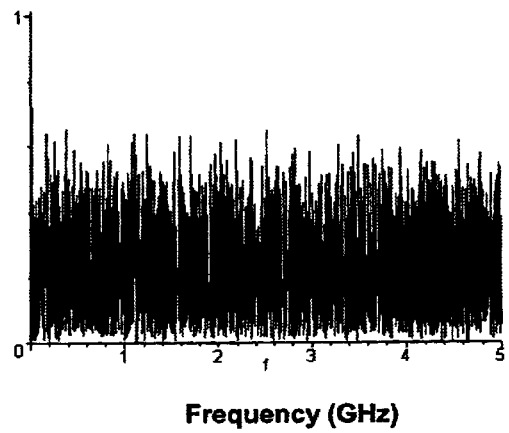
Frequency (GHz)
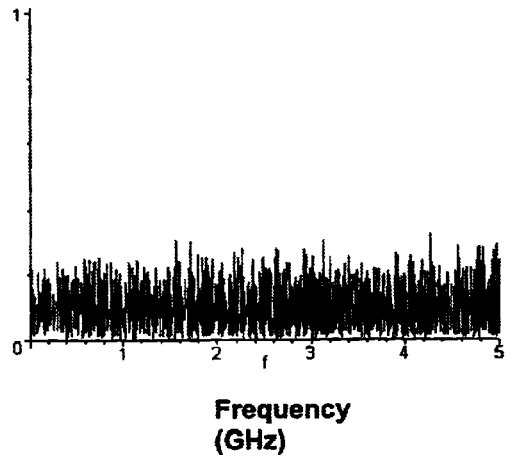
Frequency (GHz)
FIGURE 9 – Optimal Acquisition Code Combined With Optimal Channelization Code

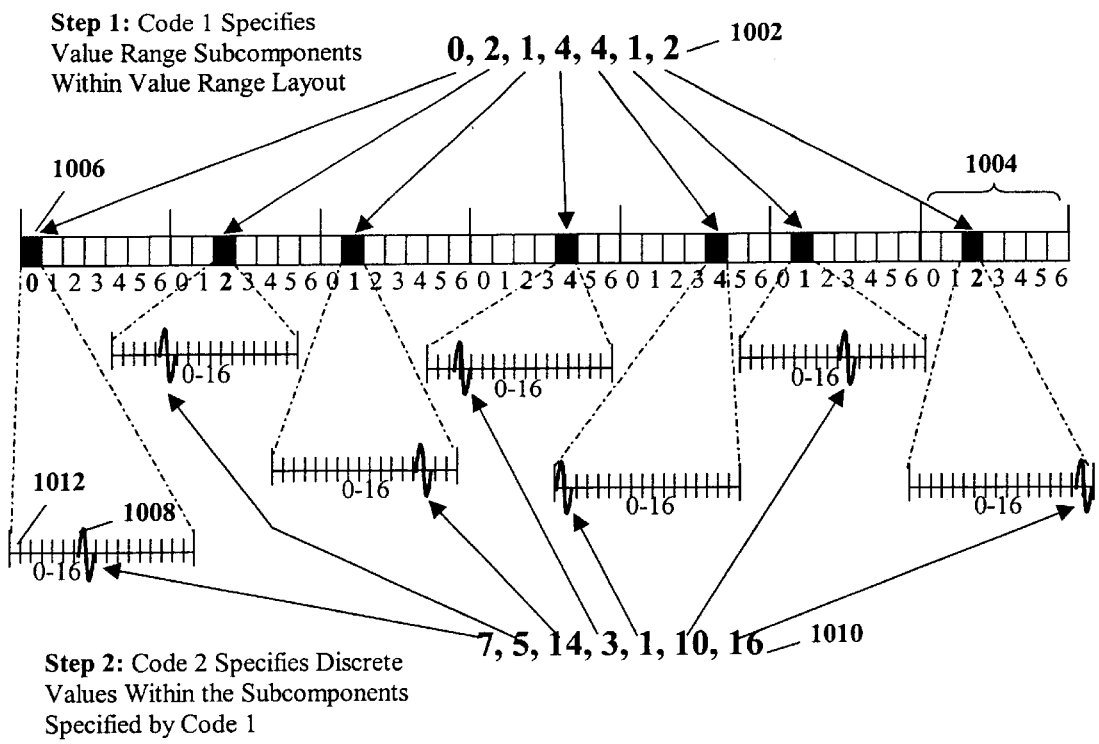
FIGURE 10. Nested Combination Codes

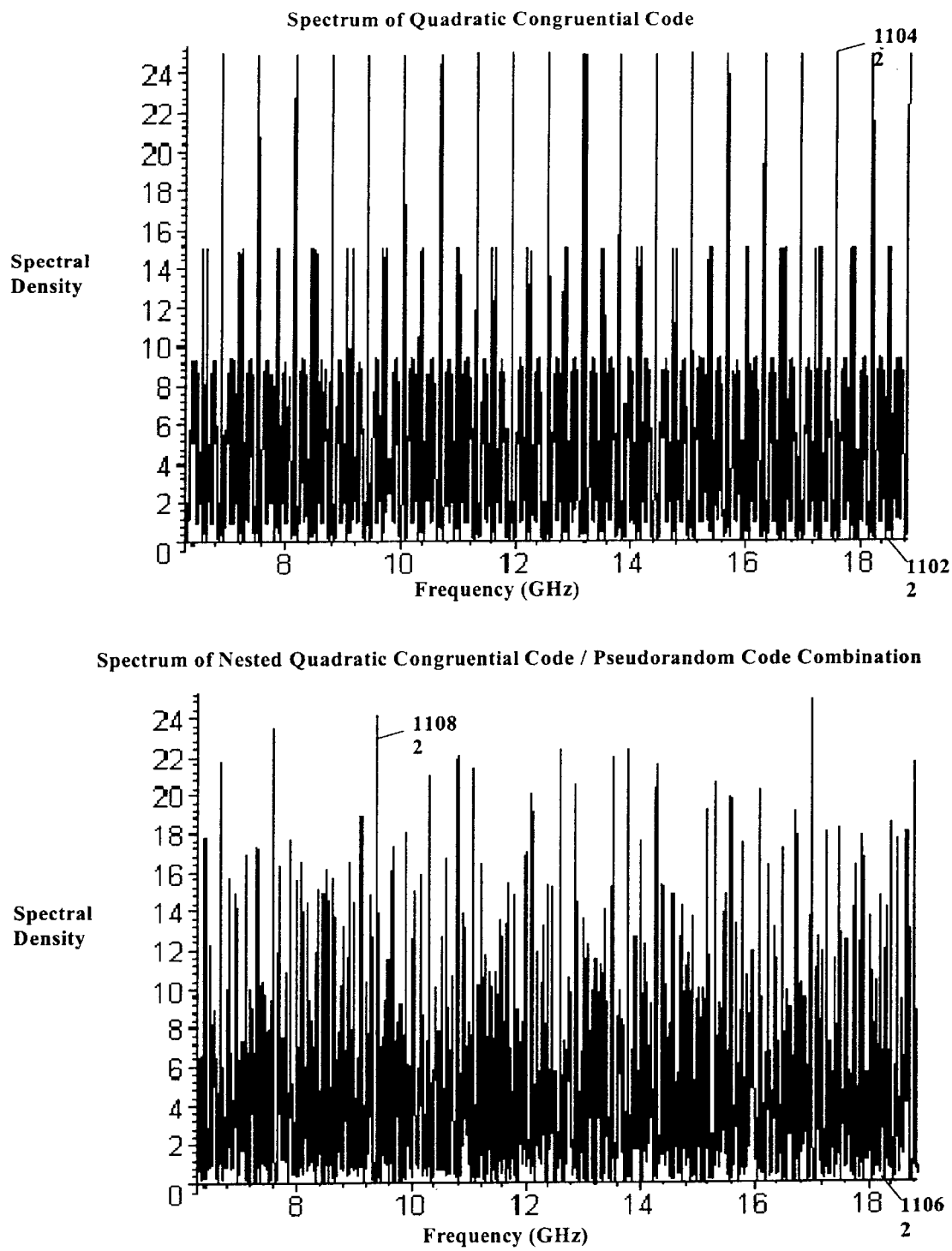
FIGURE 11. Spectral Smoothing Using Nested Combination Codes

Example 1: Sequential Combination of Two or More Repeating Nested Codes
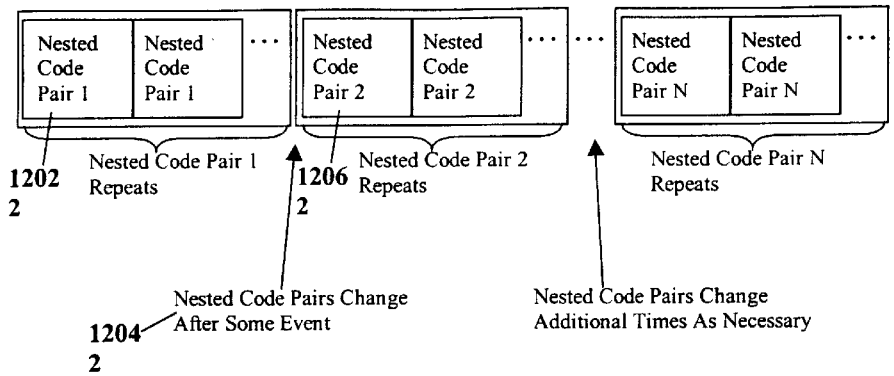
Example 2: Repeating Sequential Combination of Two or More Repeating Nested Codes
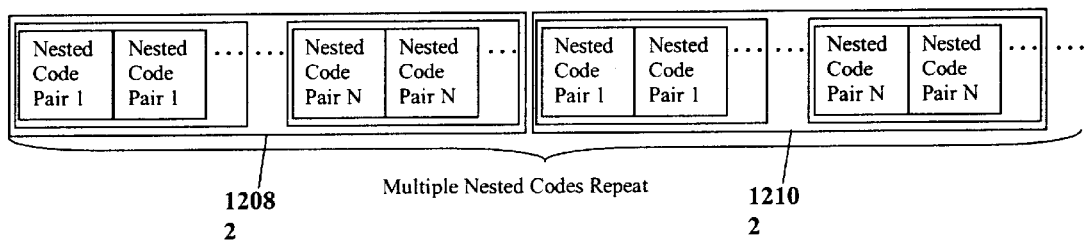
FIGURE 12. Sequential Nested Combination Codes

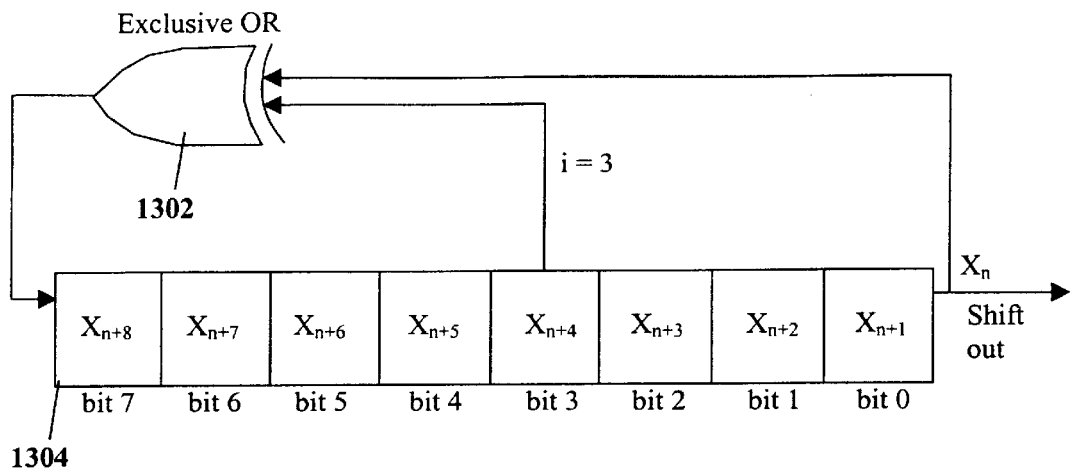
FIGURE 13a. Linear Feedback Shift Register
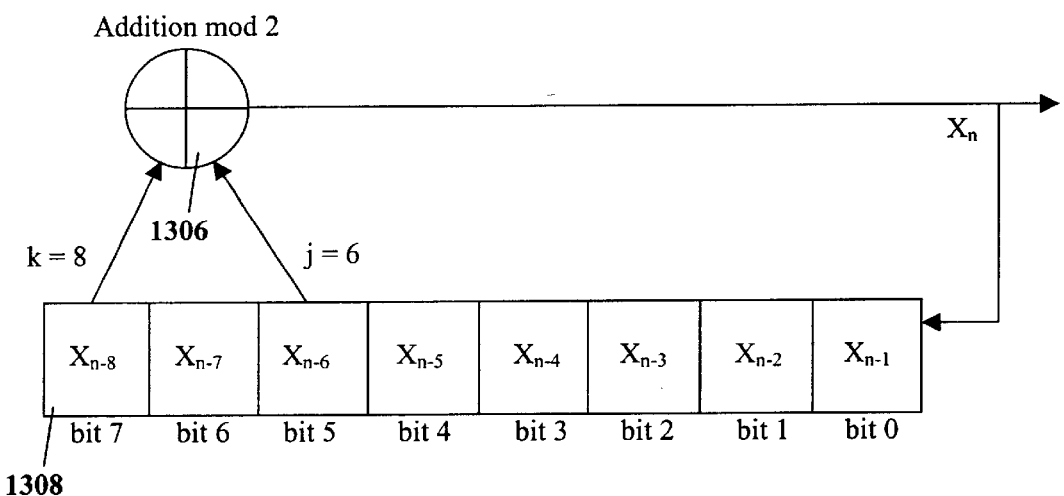
FIGURE 13b. Lagged-Fibonacci Shift Register Generator

METHOD AND APPARATUS FOR POSITIONING PULSES OVER TIME BY APPLYING TIME-HOPPING CODES HAVING PRE-DEFINED CHARACTERISTICS

CROSS-REFERENCE TO OTHER APPLICATIONS

The following applications of common assignee may contain common disclosure with the present application:

U.S. patent application Ser. No. 09/592,250 entitled "A METHOD FOR SPECIFYING NON-TEMPORAL PULSE CHARACTERISTICS", filed concurrently herewith.

U.S. patent application Ser. No. 09/592,249 entitled "A METHOD AND APPARATUS FOR MAPPING PULSES OVER A TIME LAYOUT HAVING NON-ALLOWABLE TIME REGIONS", filed concurrently herewith.

U.S. patent application Ser. No. 09/592,248 entitled "A METHOD AND APPARATUS FOR POSITIONING PULSES IN TIME", filed concurrently herewith.

U.S. patent application Ser. No. 09/591,691 entitled "A METHOD AND APPARATUS FOR MAPPING PULSES TO A NON-FIXED LAYOUT", filed concurrently herewith.

U.S. patent application Ser. No. 09/592,288 entitled "A METHOD AND APPARATUS FOR SPECIFYING PULSE CHARACTERISTICS USING A CODE THAT SATISFIES PREDEFINED CRITERIA", filed concurrently herewith.

U.S. patent application Ser. No. 09/592,290 entitled "METHOD FOR SPECIFYING PULSE CHARACTERISTICS USING CODES", filed concurrently herewith.

U.S. patent application Ser. No. 09/592,289 entitled "A METHOD FOR SPECIFYING NON-ALLOWABLE PULSE CHARACTERISTICS", filed concurrently herewith.

The above-listed applications are incorporated herein by reference in their entireties.

BACKGROUND OF THE INVENTION

1. Field of the Invention

The present invention relates to impulse transmission systems and, more particularly, to a method of applying time-hopping codes for time positioning of pulses in an impulse transmission system.

2. Related Art

As the availability of communication bandwidth in the increasingly crowded frequency spectrum is becoming a scarce and valuable commodity, Time Modulated Ultra Wideband (TM-UWB) technology provides an excellent alternative for offering significant communication bandwidth, particularly, for various wireless communications applications. Because TM-UWB communication systems are based on communicating extremely short-duration pulses (e.g., pico-seconds in duration), such systems are also known as impulse radio systems. Impulse radio systems were first described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990), and U.S. Pat. No. 5,363,057 (issued Nov. 8, 1994) to Larry W. Fullerton, and U.S. Pat. No. 5,677,927 (issued Oct. 14, 1997), U.S. Pat. No. 5,687,169 (issued Nov. 11, 1997), and U.S. Pat. No. 5,832,035 (issued Nov. 3, 1998) to Larry W. Fullerton, et al. These patents are incorporated herein by reference.

Multiple access impulse radio systems are radically different from conventional Code Division Multiple Access (CDMA), Time Division Multiple Access (TDMA) and Frequency Division Multiple Access (FDMA) systems. Unlike such systems, which use continuous sinusoidal waveforms for transmitting information, a conventional impulse radio transmitter emits a low power electromagnetic train of short pulses, which are shaped to approach a Gaussian monocycle. As a result, the impulse radio transmitter uses very little power to generate noise-like communication signals for use in multiple-access communications, radar and positioning applications, among other things. In the multi-access communication applications, the impulse radio systems depend, in part, on processing gain to achieve rejection of unwanted signals. Because of the extremely high achievable processing gains, the impulse radio systems are relatively immune to unwanted signals and interference, which limit the performance of systems that use continuous sinusoidal waveforms. The high processing gains of the impulse radio systems also provide much higher dynamic ranges than those commonly achieved by the processing gains of other known spread-spectrum systems.

Impulse radio communication systems transmit and receive the pulses at precisely controlled time intervals, in accordance with a time-hopping code. As such, the time-hopping code defines a communication channel that can be considered as a unidirectional data path for communicating information at high speed. In order to communicate the information over such channels, typical impulse radio transmitters use position modulation, which is a form of time modulation, to position the pulses in time, based on instantaneous samples of a modulating information signal. The modulating information signal may for example be a multi-state information signal, such as a binary signal. Under this arrangement, a modulator varies relative positions of a plurality of pulses on a pulse-by-pulse basis, in accordance with the modulating information signal and a specific time-hopping code that defines the communication channel.

In applications where the modulating information signal is a binary information signal, each binary state may modulate the time position of more than one pulse to generate a modulated, coded timing signal that comprises a train of identically shaped pulses that represent a single data bit. The impulse transmitter applies the generated pulses to a specified transmission medium, via a coupler, such as an antenna, which electromagnetically radiates the pulses for reception by an impulse radio receiver. The impulse radio receiver typically includes a single direct conversion stage. Using a correlator, the conversion stage coherently converts the received pulses to a baseband signal, based on a priori knowledge of the time-hopping code. Because of the correlation properties of the selected time-hopping codes, the correlator integrates the desired received pulses coherently, while the undesired noise signals are integrated non-coherently such that by comparing the coherent and non-coherent integration results, the impulse receiver can recover the communicated information.

Conventional spread-spectrum code division multiple access (SS-CDMA) techniques accommodate multiple users by permitting them to use the same frequency bandwidth at the same time. Direct sequence CDMA systems employ pseudo-noise (PN) codewords generated at a transmitter to "spread" the bandwidth occupied by transmitted data beyond the minimum required by the data. The conventional SS-CDMA systems employ a family of orthogonal or quasiorthogonal spreading codes, with a pilot spreading code sequence synchronized to the family of codes. Each user is assigned one of the spreading codes as a spreading function. One such spread-spectrum system is described in U.S. Pat. No. 4,901,307 entitled SPREAD-SPECTRUM MULTIPLE ACCESS COMMUNICATION SYSTEM USING SATELLITE OR TERRESTRIAL REPEATERS by Gilhousen et al.

Unlike direct sequence spread-spectrum systems, the time-hopping code for impulse radio communications is not necessary for energy spreading, because the monocycle pulses themselves have an inherently wide bandwidth. Instead, the impulse radio systems use the time-hoping codes for channelization, energy smoothing in the frequency domain, and interference suppression. The time-hoping code defines a relative position of each pulse within a group of pulses, or pulse train, such that the combination of pulse positions defines the communications channel. In order to convey information on such communication channel, each state of a multi-state information signal varies a relative pulse position by a predefined time shift such that a modulated, coded timing signal is generated comprising a train of pulses, each with timing corresponding to the combination of the time position coding and the multi-state modulation.

In one conventional binary approach, pulses are time-modulated forward or backward about a nominal position. More specifically, each pulse is time modulated by adjusting its position within a time frame to one of two or more possible times. For example, in order to send a "0" binary bit during the time frame, the pulse may be offset from a nominal position of the time frame by about −50 pico-seconds. For a "1" binary state, the pulse may be offset from the nominal position by about +50 pico-seconds. Conventional coders that generate the time-hoping code do so in response to a periodic timing signal that corresponds to the data-rate of the multi-state information signal. The data rate of the impulse radio transmission may for example be a fraction of a periodic timing signal that is used as a time base or time reference.

In practice, decoding errors are minimized using distinctive time-hopping codes with suitable autocorrelation and cross-correlation properties. The cross-correlation between any two time-hopping codes should be low for minimal interference between multiple users in a communications system or between multiple target reflections in radar and positioning applications. At the same time, the autocorrelation property of a time-hoping code should be steeply peaked, with small side-lobes. Maximally peaked time-hopping code autocorrelation yields optimal acquisition and synchronization properties for communications, radar and positioning applications.

Various coding schemes with known correlation characteristics are available. For example, algebraic codes, Quadratic Congruential (QC) codes, Hyperbolic Congruential (HC) codes and optical codes have been suggested in the past for coding in impulse radio systems. Generally, based on known assumptions, the coding schemes guarantee a maximum number of pulse coincidences, i.e., hits, for any defined time frame or time frame shift during which the codes are repeated. For example, HC codes are guaranteed a maximum of two hits for any sub-frame or frame shift.

McCorkle in U.S. Pat. No. 5,847,677 discloses a random number generator for generating a pseudo-random code for use with jittered pulse repetition interval radar systems. The code is generated by a random number generator that possesses certain attributes desirable for a jittered radar. As disclosed, the attributes related to a flat frequency spectrum, a nearly perfect spike for an autocorrelation function, a controllable absolute minimum and maximum interval, long sequences that do not repeat, and a reasonable average pulse rate.

One known coding technique for an impulse radio is disclosed by Barrett in U.S. Pat. No. 5,610,907, entitled "Ultrafast Time-hopping CDMA-RF Communications: Code-As-Carrier, Multichannel Operation, High data Rate Operation and Data Rate on Demand." According to the disclosed techniques, two levels of coding are used: major orthogonal codes are applied to provide multiple channels, and forward error correction (FEC) codes are applied to information data before transmission. The disclosed system relies on dividing time into repetitive super-frames, frames and sub-frames. As disclosed, a super-frame corresponds to a time interval of about 1 millisecond, representing one repetition of a code pattern, where as a frame is defined as a time interval of about 1 microsecond divided according to a code length. A sub-frame corresponds to a short time interval of about 1 nano second during which a pulse is time positioned.

TM-UWB technology may be used in a wide variety of applications, such as multiple-access communication systems, positioning systems, radar systems, etc. Such applications have varying requirements for correlation and spectral properties of the pulse trains they employ. The described time-hopping code methods produce codes that can be employed to address either a spectral property requirement or a correlation property requirement of given application, but are limited in their ability to address both correlation and spectral property requirements. As a result, such codes are limited in their ability to address both signal acquisition and channelization requirements of a given TM-UWB application requiring tradeoffs to be made when selecting a time-hopping code. Because of the wide variety of TM-UWB technology applications and limitations to current time-hopping code generation and mapping methods, there exists a need for code generation and mapping methods that satisfy correlation property and spectral property requirements of TM-UWB applications.

SUMMARY OF THE INVENTION

Briefly, according to the present invention, a sequential and/or nested combination of two or more time-hopping codes is used to specify pulse positions in time such that the correlation and/or spectral properties of the combined codes are realized. The present invention provides a method for positioning of pulses over time that specifies a time layout that is subdivided into at least a first and a second time components. The present invention applies a first time-hopping code having first pre-defined properties to the first time component, and applies a second time-hopping code having second pre-defined properties to the second time component. The first time-hopping code may be generated using a numerical code generation technique, for example, one with nearly ideal autocorrelation properties. In one embodiment, the numerical code generation technique can include Welch-Costas Array, Golomb-Costas Array, or Hyperbolic Congruential code generation techniques. The second time-hopping code may also be generated using a numerical code generation technique, for example, one with nearly ideal cross-correlation properties. In one embodiment, the numerical code generation technique can include Quadratic Congruential, Linear Congruential, or Hyperbolic Congruential code generation techniques.

According to some of the more detailed features of the present invention, the first and second time components may have the same or different sizes. In an exemplary embodiment, the time layout is sequentially subdivided into a first or a second subdivision time components. In one embodiment, the first and second subdivision time components can have the same or different sizes.

According to some of the more detailed features of the present invention, the first and second time components may contain discrete time values. In one embodiment, the discrete time values can be evenly distributed or non-evenly distributed within the time components.

According to some of the more detailed features of the present invention, the first and second time components may be sequentially subdivided into at least a first or a second subdivision time component containing discrete time values. In one embodiment, the first and second subdivision time components can have the same or different sizes. In one embodiment, the discrete time values can be evenly distributed or non-evenly distributed within the subdivision time components.

According to other detailed features of the invention, the first and second pre-defined properties may relate to a spectral property or a correlation property, such as an auto-correlation property or a cross-correlation property. When predefined properties relate to spectral or correlation properties, the first and second pre-defined properties may relate to different spectral and correlation properties. For example, the first predefined properties may relate to the auto-correlation properties and the second predefined properties may relate to the cross-correlation properties.

In another embodiment of the invention, the first or second time-hopping code is generated using a numerical code generation technique with nearly ideal spectral properties. In an embodiment, the numerical code generation technique can include linear congruential pseudorandom number generator, additive lagged-Fibonacci pseudorandom number generator, linear feedback shift register, lagged-Fibonacci shift register, chaotic code generator or optimal Golomb ruler code generator techniques.

In another embodiment of the invention, the first time-hopping code specifies subdivision time components within which pulses are to be placed and the second time-hopping code specifies discrete time positions within the subdivision time components specified by the first time-hopping code.

In another embodiment of the invention, first and second time-hopping codes are mapped to the first time component, and first and second time-hopping codes are mapped to the second time component, where each first time-hopping code specifies subdivision time components within which pulses are to be placed and each second time-hopping code specifies discrete time positions within the subdivision time components specified by the corresponding first time-hopping code.

BRIEF DESCRIPTION OF DRAWINGS

The present invention will be described with reference to the accompanying figures, wherein:

FIG. 6 illustrates a sequential combination of two or more repeating codes and a repeating sequential combination of two or more repeating codes;

FIG. 7a illustrates mapping of a sequential combination of two or more repeating same length codes to a repeating layout and mapping of a repeating sequential combination of two or more repeating same length codes to a repeating layout;

FIG. 7b illustrates mapping a sequential combination of two or more repeating codes of different sizes to a sequential combination of two or more repeating layouts of different sizes and mapping a repeating sequential combination of two or more repeating codes of different sizes to a repeating sequential combination of two or more repeating layouts of different sizes;

FIG. 9 illustrates use of a sequential combination of an optimal code for signal acquisition and an optimal code for channelization;

FIG. 10 illustrates use of a first code to specify subcomponents within a value range layout and a second code to specify discrete values within the subcomponents specified by the first code;

FIG. 11. illustrates the effect on the spectrum of a quadratic congruential code resulting from the use of a nested pseudorandom code;

FIG. 12 illustrates a sequential combination of two or more repeating nested codes and a repeating sequential combination of two or more repeating nested codes.

FIG. 13a is a diagram of a binary linear feedback shift-register pseudorandom number generator;

FIG. 13b is a diagram of an additive Lagged-Fibonacci shift register pseudorandom number generator;

DETAILED DESCRIPTION OF THE PREFERRED EMBODIMENTS

I. Introduction

The present invention provides a method of using a generated code to specify positions of pulses within a pulse train for use in an impulse radio transmission system. Usually, each generated code consists of a set or a number of code element values. The method involves defining one or more layouts of time periods over which the pulse train is overlaid, generating two or more time-hopping codes with pre-defined properties, and mapping the codes to the time layout(s). In one exemplary embodiment a combination of codes are mapped to sequential layouts. In another embodiment a combination of codes are nested such that one code specifies subcomponents within a layout while the second code specifies discrete time values within the subcomponents specified by the first code. In another embodiment a combination of nested codes are mapped to sequential layouts.

II. Time Period Layouts

In a pulse transmission system, a sequence of pulses known as a pulse train is transmitted and received over a period of time such that the relative positioning of the pulses in time defines a channel used by the system to transmit information. Time period(s) can be laid out in a multitude of ways to accommodate a wide variety of pulse transmission system applications. One approach involves a value range layout where a period of time is divided into smaller and smaller components. The division is used to achieve a desired component resolution in order to facilitate mapping of a code element value to a time position value that resides within a layout component, which corresponds to some range of time values.

Figure 1:
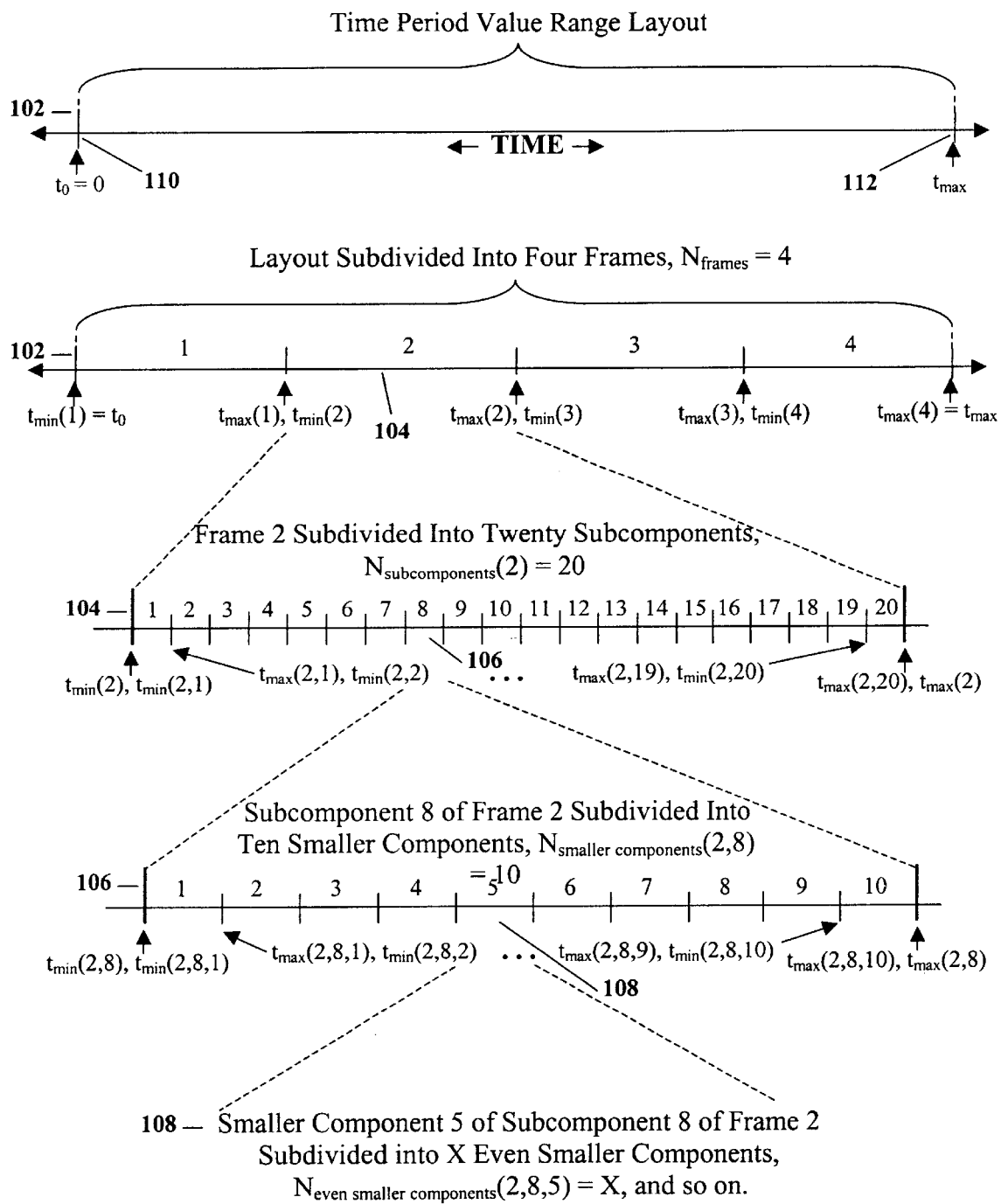
FIG. 1 illustrates a time period including exemplary time period layout parameters, and exemplary subdivisions of the time period including frames, subcomponents, smaller time components and even smaller time components.

FIG. 1 illustrates an exemplary component based time period value range layout 102 of time position values between a minimum value of $t_0$ at 110, and a maximum value of $t_{max}$ at 112. The layout 102 may include frames 104. Frames 104 may include subcomponents 106. Subcomponents 106 may include smaller components 108, which in turn may include even smaller components. The process can be repeated, ad infinitum, so that smaller and smaller components can be obtained.

The following describes this process in detail. Referring back to FIG. 1, a layout parameter, $t_{max}$, can be specified which defines the length of a time period layout 102, wherein the time period has a relative minimum time value of $t=t_0=0$ (110) and a relative maximum time value of $t=t_{max}$ (112). A second layout parameter, $N_{frames}$, can be specified to divide the time period layout 102 into one or more frames 104 of the same size or of different sizes with each frame 104 (indexed by n) having a minimum time value, $t_{min}(n)$, and a maximum time value, $t_{max}(n)$, where n=1 to $N_{frames}$.

Multiple frame sizes may be employed to accommodate multiple data stream systems, to add an encryption dimension, and/or for many other purposes. For example, one or more acquisition frames and/or one or more header frames can be intermixed with one or more frames containing user data, wherein the acquisition, header, and user data frames have different sizes.

Alternatively, same size frames may be employed such that acquisition, header, and user data are combined into a single data stream that is deciphered via a communications protocol once the data stream is captured. The number and size of frames used in a given layout can also be tailored to meet specific application requirements. They can also be used to remain within system implementation limits, to achieve one or more of a variety of system characteristics in areas such as performance (i.e., bit rate), reliability (i.e., bit error rate), system-simplicity, ease-of-use, etc., and/or for many other reasons.

When different sized frames 104 are employed, minimum and maximum time values are specified for each frame 104. The minimum time value for a given frame, $t_{min}(n)$, may equal the maximum time value of the preceding frame, $t_{max}(n-1)$, or $t_0$ (110). The maximum time value of a given frame, $t_{max}(n)$, may equal the minimum time value for the following frame, $t_{min}(n+1)$, or $t_{max}$ (112). When same sized frames are employed, the time period is evenly divided such that $t_{max}(n)-t_{min}(n)$ is equal for each frame n.

An array of layout parameters, $N_{subcomponents}(N_{frames})$, can be specified to subdivide frames into subcomponents. For example, frames may be subdivided into subcomponents 106 of the same or different sizes with each subcomponent 106 (indexed by m) of frame 104 (indexed by n) having a minimum time value, $t_{min}(n,m)$, and a maximum time value, $t_{max}(n,m)$, where n=1 to $N_{frames}$ and m=1 to $N_{subcomponents}(n)$.

Multiple subcomponent sizes may be employed to accommodate multiple bit rates, to achieve desirable correlation properties, to add an encryption dimension, and/or for many other purposes, as will be recognized by persons skilled in the art. As with frames, the number and size of subcomponents for a given frame used in a given layout can also be tailored to meet specific application requirements. These parameters may also be selected to remain within system implementation limits, to achieve one or more of a variety of system characteristics in areas such as performance (i.e., bit rate), reliability (i.e., bit error rate), system-simplicity, ease-of-use, etc., and/or for many other reasons.

When different sized subcomponents are employed, minimum and maximum time values are specified for each subcomponent 106 (m) of each frame 104 (n). The minimum time value for a given subcomponent, $t_{min}(n,m)$, may equal the maximum time value of the preceding subcomponent, $t_{max}(n,m-1)$, or the minimum time value of the frame in which the subcomponent resides, $t_{min}(n)$. The maximum time value of a given subcomponent, $t_{max}(n,m)$, may alternatively equal the minimum time value for the following subcomponent, $t_{min}(n,m+1)$, or the maximum time value of the frame in which the subcomponent resides, $t_{max}(n)$ When same sized subcomponents are employed, frames may be evenly divided. As a result, $t_{max}(n,m)-t_{min}(n,m)$ may be equal for each subcomponent 106 of a frame 104 or for all frames 104 such that all subcomponents of a given frame 104 are of the same size. The subcomponent sizes may vary from frame to frame or all subcomponents of all frames may be the same size depending on the sizes of the frames and the numbers of subcomponents within the frames.

In a manner consistent with the subdivision of frames into subcomponents, additional multi-dimensional arrays of layout parameters can be used to further subdivide subcomponents into smaller components 108 of the same or different sizes, ad infinitum. This subdivision may continue until a smallest desirable time component resolution is attained. The time components at each resolution level may have a minimum time value, $t_{min}(n,m,\ldots,a)$, and a maximum time value, $t_{max}(n,m,\ldots,a)$, where n=1 to $N_{frames}$, m=1 to $N_{subcomponents}(n)$, ..., and a=1 to $N_{smallest\ components}(n,m,\ldots)$.

Such further subdivision of subcomponents into smaller and smaller time components enables systems with finer and finer tuning resolution and thus higher and higher fidelity. This increases modulation timing accuracy, and can be useful for other purposes as will be recognized by persons skilled in the art.

As with frames 104 and subcomponents 106, the number and size of these smaller time components 108 can also be tailored to meet specific application requirements. These parameters can also be tailored to remain within system implementation limits, to achieve one or more of a variety of system characteristics in areas such as performance (i.e., bit rate), reliability (i.e., bit error rate), system-simplicity, ease-of-use, etc., and/or for many other reasons. When different sizes of these smaller time components 108 are employed, minimum and maximum time values are specified for each time component (a). The minimum time value for a component, $t_{min}(n,m, \ldots, a)$, may be equal to the maximum time value of the preceding component, $t_{max}(n,m, \ldots, a-1)$, or the minimum time value of the next higher-level time component in which the time component resides, $t_{min}(n,m, \ldots)$. The maximum time value of a given time component, $t_{max}(n,m, \ldots, a)$, may alternatively be equal to the minimum time value for the following component, $t_{min}(n,m, \ldots, a+1)$, or the maximum time value of the next higher level time component in which the time component resides, $t_{max}(n,m, \ldots)$.

When same-sized smaller time components are employed, the next higher-level components may be evenly divided. Consequently, $t_{max}(n,m, \ldots, a)-t_{min}(n,m, \ldots, a)$ may be equal for each time component of a given next higher level component. For all next higher-level components, all time components of a given next higher-level component may be of the same or different size.

Under one arrangement, the time component sizes may vary from next higher-level component to next higher-level component. Alternatively, all time components of all higher level components may be of the same size, depending on the sizes of the next higher level components and the numbers of time components in the next higher level components.

At the top of FIG. 1 a time period of length $t_{max}$ is depicted such that the time period is bounded by endpoints of $t_0$ (110) and $t_{max}$ (112). Beneath this illustration, an equivalent time period is shown. As shown, the time period is subdivided into four frames 104 by setting the layout parameter $N_{frames}$ to a value of four (4). The size of each frame 104 is established by setting the minimum and maximum time values of each frame, $t_{min}(n)$ and $t_{max}(n)$, where n=1 to 4.

An enlargement of the second frame 104 is then shown. The frame is subdivided into twenty subcomponents 106 by setting the layout parameter $N_{subcomponents}(2)$ to a value of twenty (20). The size of each subcomponent 106 has been established by setting the minimum and maximum time values of the subcomponents 106 within the second frame 104, $t_{min}(n,m)$ and $t_{max}(n,m)$, where n=2 and m=1 to 20.

An enlargement of the eighth subcomponent 106 of the second frame 104 is then shown. In this embodiment, the subcomponent 106 is subdivided into ten smaller time components 108 by setting the layout parameter $N_{smaller-components}(2,8)$ to a value of ten (10). The size of each smaller time component 108 is established by setting the minimum and maximum time values of the smaller components within the eighth subcomponent 106 of the second frame 104, $t_{min}(n,m,l)$ and $t_{max}(n,m,l)$, where n=2, m=8, and l=1 to 10.

It is then shown that these smaller time components could be subdivided into x even smaller time components (whose size is not shown) using another layout parameter [e.g., $N_{even-smaller-components}(2,8,5)=x$], which can be further subdivided ad infinitum. Not shown in the figure are the enlargements of the other frames, subcomponents, and smaller time components, which for this example would also contain twenty subcomponents, ten smaller time components, and x even smaller time components, respectively.

Figure 2A:
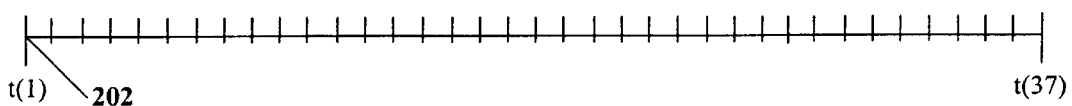
FIG. 2a illustrates a discrete value layout of thirty-seven evenly distributed values including exemplary layout parameters.
Figure 2B:
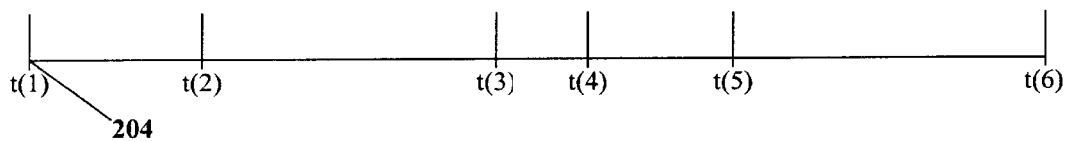
FIG. 2b illustrates a discrete value layout of six non-evenly distributed values including exemplary layout parameters.

Another approach to defining a time period layout is to specify a layout of discrete time values to which individual code elements can map. As depicted in FIGS. 2a and 2b, a layout parameter, $N_{discrete\ time\ valves}$ can be specified to identify some number of discrete time values within a layout having a value, t(n), where n=1 to $N_{discrete\ time\ values}$. Discrete time values may be evenly distributed or not as depicted in the two figures. In FIG. 2a, 37 evenly-distributed discrete time values 202, labeled t(1) through t(37), are shown where $N_{discrete\ time\ values}=37$. In FIG. 2b, six non evenly-distributed discrete time values 204, labeled t(1) through t(6), are shown where $N_{discrete\ time\ values}=6$.

Figure 3:
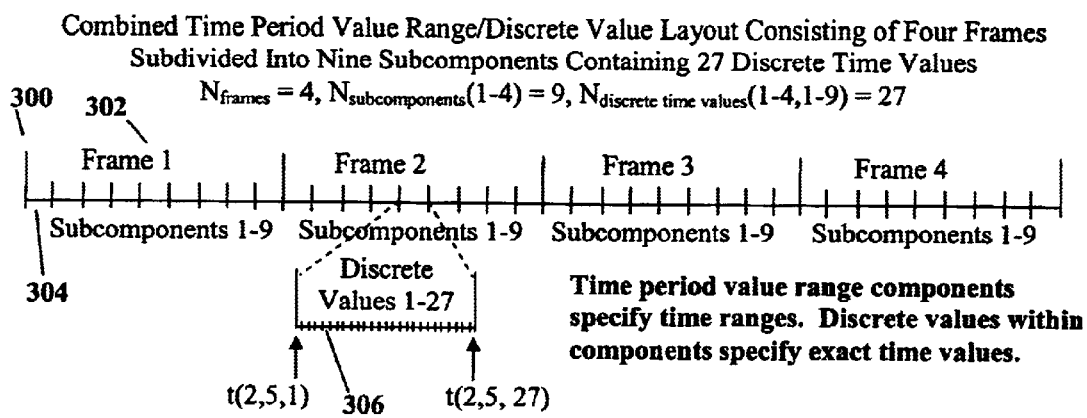
FIG. 3 illustrates a combined value range/discrete value layout of four frames subdivided into nine subcomponents containing 27 discrete time values each including exemplary layout parameters.

The discrete value layout approach can be combined with a value range layout approach, enabling code element values to specify a component within a value range layout and a discrete value within the component. The use of a combination of these two layout approaches is shown in FIG. 3. In FIG. 3, a time value range layout 300 is subdivided into four frames 302 that are subdivided into nine subcomponents 304 containing 27 discrete time values 306 each. The layout is specified by setting $N_{frames}=4$, $N_{subcomponents}(1-4)=9$, and $N_{discrete\ time\ values}(1-4,1-9)=27$.

III. Code Mapping

A time-hopping code is comprised of code elements whose values map pulses to time positions within the defined layout. The numbering scheme used for a code must be consistent with the numbering scheme used for the defined time period layout to allow mapping of code element values to layout components or discrete positions within the layout.

Components or discrete values may be numbered beginning with zero, one, or with any other number. Components produced by subdividing higher level components, such as subcomponents or smaller time period components, may be numbered per higher level component such that subcomponent numbering begins again with each higher level component, or may be numbered in sequence independent of the higher level component in which they reside.

When a value range layout is employed, an established offset value can be used to specify the exact position of the pulse within the frame, subcomponent, or smaller time period component to which a code element value is mapped.

Figure 4:
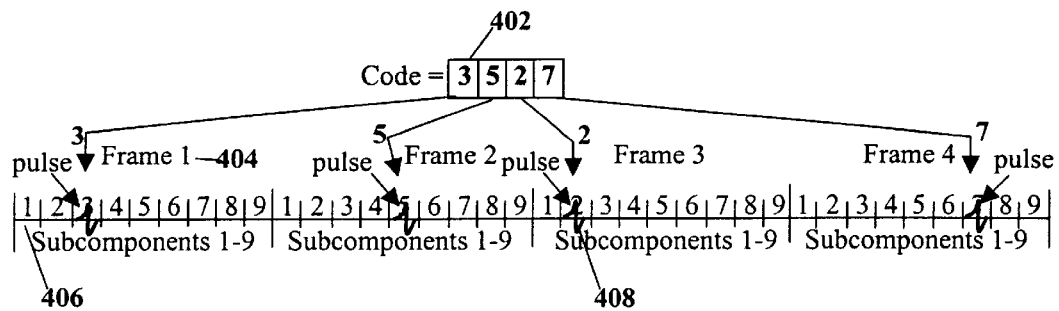
FIG. 4 illustrates a code mapping approach, depicting pulses mapped to subcomponents based on integer code element values of a time-hopping code, where an integer code element exists per frame and pulses are positioned within subcomponents using a common position offset.
Figure 5:
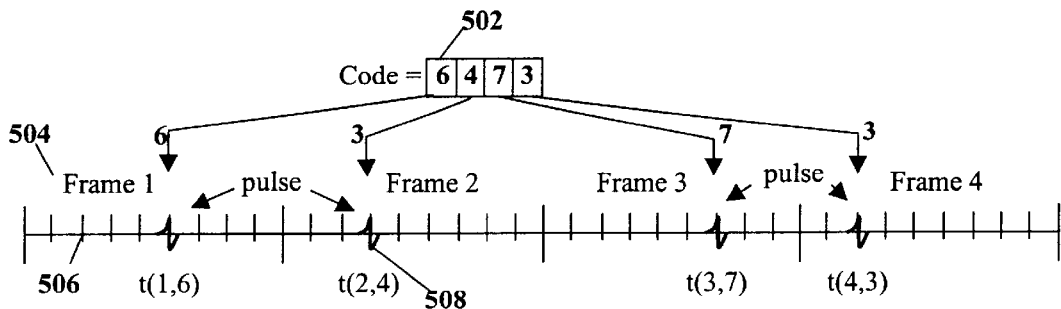
FIG. 5 illustrates a code mapping approach, depicting pulses mapped to discrete time values based on integer code element values of a time-hopping code, where an integer code element exists per frame.

FIGS. 4 and 5 illustrate mapping of time-hopping codes to a value range layout and to a discrete value range layout, respectively. Beginning with FIG. 4, the figure depicts mapping of code element values 402 to subcomponents 406 numbered per frame 404. Here, an integer code element exists per each frame. Pulses 408 are shown positioned in the approximate center of the subcomponents 406 to which code elements 402 are mapped as specified using a position offset value.

FIG. 5 shows mapping of code element values to discrete time values within a combined value range/discrete value layout, where an integer code element exists per frame. Instead of being mapped inside of the subcomponents as in FIG. 4, in FIG. 5 the code element values 502 are mapped as pulses 508 to discrete values 506 within frames 504.

The present invention provides several approaches for using two or more codes to specify time positions of pulses. Combinations of two or more codes can be used, for example, to address correlation and/or spectral properties of different TM-UWB applications.

One approach involves a sequential combination of two or more codes. FIG. 6 provides two examples of this sequential combination codes approach. In the first example, a first code 602 is shown repeating until some event 604 occurs, at which time the impulse transmission system employs a second code 606. The second code 606 is then shown repeating thereafter. It is further shown that the system may transition to additional codes as necessary. In the second example, a sequential combination of two or more codes is shown repeating. For example, whole sequences of multiple codes 608, 610 (each multiple beginning with code 1 repeating and ending with code N repeating) are repeated.

The sequential combination codes approach may be used with a single repeating time layout or with two or more different repeating time layouts, depending on whether or not the combined codes are of the same size, or length. FIG. 7a provides two examples of sequential combinations of codes mapping to a repeating layout that complement the two examples provided in FIG. 6.

In the first example, sequential combination codes 702, 706 of the same length are mapped to a repeating time layout 712a. In the second example, repeating sequential combination codes 708, 710 of the same length are mapped to a repeating layout 712b.

FIG. 7b provides two examples illustrating how the sequential combination codes approach can be used with different-sized layouts. In the first example, sequential combination codes 714, 716 of different sizes are mapped to layouts 722a having different sizes that correspond to the code sizes. In the second example, multiple sequential codes 718, 720 of different sizes are mapped to repeating layouts 722b of different sizes.

Figure 8:
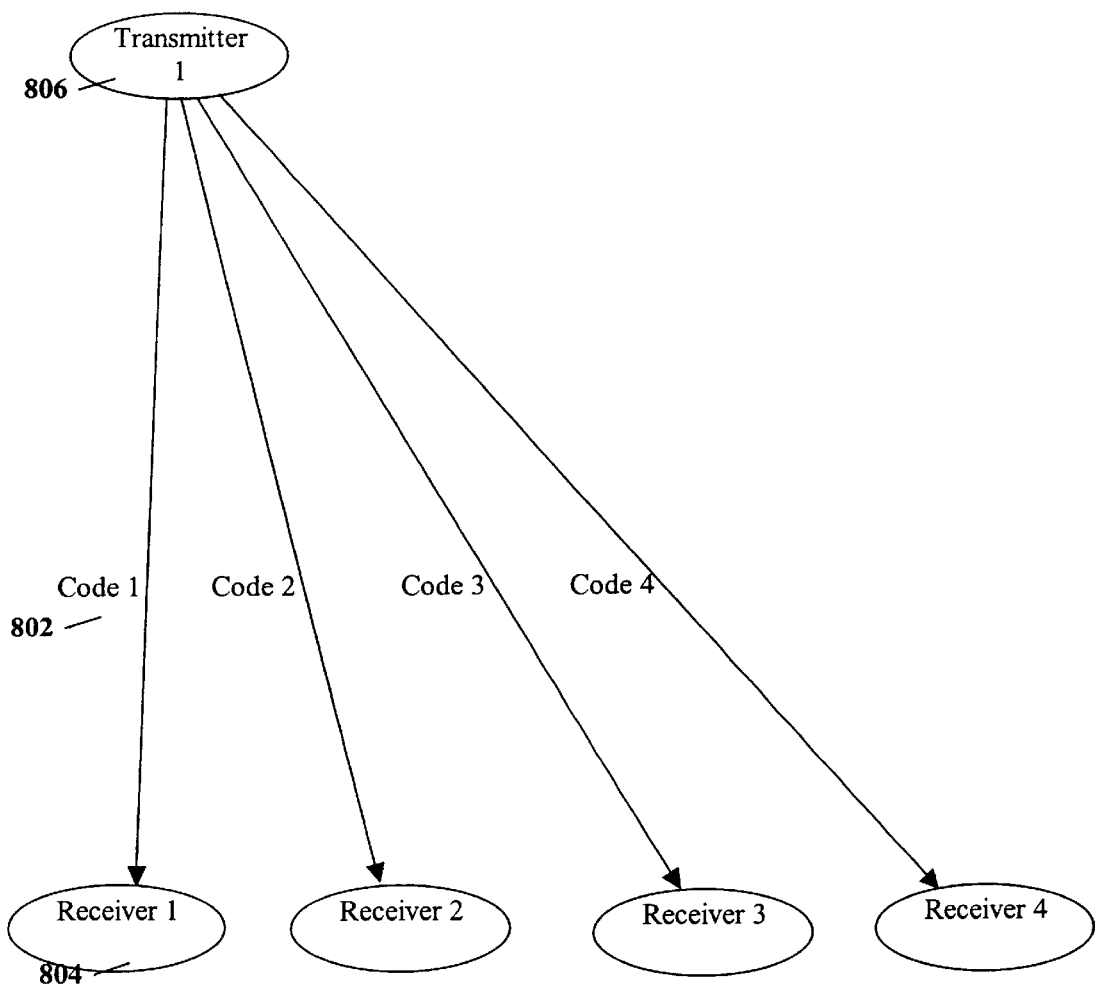
FIG. 8 illustrates multicast transmissions between a transmitter and four receivers using a sequential combination or repeating sequential combination of four repeating codes.

The single-layout mapping approaches shown in FIG. 7a can be used to support multiple channel, or multicast communications, where a single transmitter emits a pulse train per a sequential combination of codes, and where each code represents a separate channel recognizable by a receiver. This application of the single-layout sequential combination codes approach is shown in FIG. 8. In FIG. 8, the transmitted pulse train (from transmitter 806) consists of four codes 802 representing channels to four receivers 804, where the sequential combination codes can be repeated, as described with respect to FIGS. 7a, 7b.

In one exemplary embodiment of the invention, the sequential combination codes approach can be used to improve signal acquisition and channelization. In FIG. 9 a sequential combination of two codes 902 and 904 is shown. The first code 902, having autocorrelation properties that are beneficial during signal acquisition, e.g., a Welch-Costas code, Golumb-Costas code, or hyperbolic congruential code, repeats until the pulse train signal is acquired. After signal acquisition, the system switches to a second code 904 that has cross-correlation properties that provide for superior channelization, e.g., a quadratic congruential code, linear congruential code, or hyperbolic congruential code. This sequential combination of two codes 902, 904 can be repeated in order to provide receivers a periodic opportunity to acquire or reacquire the signal.

Another approach provided by the present invention can be described as a nested combination of codes. This approach is illustrated in FIG. 10. With this approach, a first code 1002 having optimal correlation properties is used to specify subcomponents 1006 within a value range layout (e.g., subcomponents 1006 within frames 1004) within which pulses 1008 are to be placed. A second code 1010 having optimal spectral properties is used to specify the exact positions 1012 of pulses 1008 within the subcomponents 1006 specified by the first code 1002.

Specifically, in FIG. 10, a value range time layout is shown consisting of seven frames 1004 that are subdivided into seven subcomponents 1006 containing seventeen discreet time values 1012 each. The subcomponents 1006 within each frame 1004 are numbered 0 through 6 and the seventeen discreet values 1012 within each subcomponent are numbered 0 through 16.

A first code 1002, {0, 2, 1, 4, 4, 1, 2}, which is generating using the quadratic congruential code generation technique (described below), is mapped to subcomponents 1006 within each frame 1004. The seven subcomponents 1006 to which the elements of the first code 1002 are mapped are shown enlarged.

A second code 1012, {7, 5, 14, 3, 1, 10, 16}, which is generated using a pseudorandom code generation technique (described below), is mapped to discrete values 1012 within the subcomponents 1006 specified by the first code 1002.

FIG. 11 illustrates the effect to the energy spectrum of a pulse train resulting from use of the nested combination codes approach (as described above). At the top of the figure, the spectrum 1102 of a pulse train produced using a quadratic congruential code is shown. Here, the pulses are positioned within each subcomponent specified by the code using a position offset (e.g., beginning of each component). Comb line structures 1104 having approximately the same spectral density can be seen at certain frequencies, where the amplitude and periodicity of the comb lines is a result of the use of a common offset value to position pulses within the subcomponents specified by the code.

In the bottom of FIG. 11, there is shown the spectrum 1106 of a pulse train producing using the same quadratic congruential code combined with a second nested pseudorandom code. (The second code is used to specify random pulse positions within the subcomponents specified by the quadratic congruential code.) A significant change to the spectrum is shown, as the spectral energy has been spread out among the frequencies, or smoothed, by use of the nested pseudorandom code. The individual randomized structures are labeled 1108.

The sequential combination code approach and the nested combination code approach can also be combined. FIG. 12 depicts two examples of using sequential nested combination codes. In the first example, a nested code pair 1202 repeats until some event 1204 occurs. After the event 1204, a second repeating nested code pair 1206 is employed. The example also shows that additional nested code pairs (not labeled) can be employed as necessary. In the second example, repeating sequential nested combination codes 1208, 1210 are depicted.

IV. Numerical Code Generation

Various numerical code generation methods can be employed to produce time-hopping codes. Generally, each method produces codes that tend to have certain correlation or spectral properties, but not both. For example, a time-hopping code can be generated using a quadratic congruential, hyperbolic congruential linear congruential, Costas array or other such numerical code generation technique designed to generate codes guaranteed to have certain correlation properties. However, the mathematicians that developed the code generation techniques were concerned with correlation properties and not spectral properties.

A quadratic congruential code of integer values can be generated using an equation of the general form:

$$y_{i,\alpha,\beta}^{QC}(k) \equiv [i(k+\alpha)^2+\beta] \bmod p$$

k=0,1, ..., p−1; i={1,2, ..., p−1}; $\alpha,\beta \in$ {0, 1, ..., p−1}, where p is a prime number. Each quadratic congruential code has p elements and $p^3-p^2$ different sequences can be generated by changing the value of parameters i, $\alpha$, and $\beta$. Quadratic congruential codes have correlation properties that guarantee a maximum of two coincidences when auto-correlated with some time offset and a maximum of four coincidences when cross-correlated with another quadratic congruential code.

A hyperbolic congruential code of integer values can be generated using an equation of the general form:

$$y_i^{HC}(k) = (ik^{-1}) \bmod p$$

$1 \leq i, k \leq p-1$,
where p is a prime number $\geq 2$ and $k^{-1}$ is the unique inverse of k modulo p. Each hyperbolic congruential code has p−1 elements and p−1 different sequences can be generated. Hyperbolic congruential codes have correlation properties that guarantee a maximum of two coincidences when autocorrelated with some time offset and a maximum of two coincidences when cross-correlated with another hyperbolic congruential code.

A linear congruential code of integer values can be generated using an equation of the general form:

$$y_{i,\beta}^{LC}(k) \equiv (ik+\beta) \bmod p$$

$1 \leq i, k \leq p-1; \beta \in \{0, 1, \ldots, p-1\}$,
where p is a prime number. Each linear congruential code has p−1 elements and p−1 different sequences can be generated. Linear congruential codes have correlation properties that guarantee a maximum of $1/\ln(p-1)$ coincidences when autocorrelated with some time offset and a maximum of $2/(p-1)$ coincidences when cross-correlated with another linear congruential code.

A Costas Array code of integer values can be generated by Welch construction using an equation of the general form:

$$y_{R,i,\alpha,\beta}^{WC}(k) \equiv (iR^{(k+\alpha)} + \beta) \bmod p$$

$k + \alpha = 1, \ldots, p-1; i \in \{1, 2, \ldots, p-1\}; \alpha, \beta \in \{0, 1, \ldots, p-1\}$,
where p is a prime number and R is a primitive element of p. Each Welch-Costas code has p−1 elements and $p^2$ different sequences can be generated. Welch-Costas codes have correlation properties that guarantee a maximum of one coincidence when autocorrelated with some time offset and a maximum of $\lambda$ coincidences when cross-correlated with another Welch-Costas code, where $R_1 = R_2^\lambda$.

A Costas Array code of integer values can also be generated by Golomb construction using an equation of the general form:

$$y_{\eta,i,\alpha,\beta}^{GC}(k) \equiv (\log_\eta(1 - \alpha^{(i-k)}) + \beta) \bmod p$$

$k = 1, \ldots, p-2; i \in \{1, 2, \ldots, p-2\}; \alpha, \beta \in \{0, 1, \ldots, p-1\}$,
where p is a prime number and $\eta$ is a primitive element of p. Each Golumb-Costas code has p−2 elements and $(p-1)^2$ different sequences can be generated. Golumb-Costas codes have correlation properties that guarantee a maximum of one coincidence when autocorrelated with some time offset and a maximum of l and m coincidences when cross-correlated with another Welch-Costas code, where $\eta_1 = \eta_2^m$ and $\alpha_1 = \alpha_2^l$.

Each of these alternative code generation schemes has corresponding characteristics to be considered in relation to the application of the pulse transmission system employing the code. For example, Costas codes have nearly ideal autocorrelation properties but somewhat less than ideal cross-correlation properties, while linear congruential codes have nearly ideal cross-correlation properties but less than ideal autocorrelation properties. In some cases, design tradeoffs require that a compromise between two or more code generation schemes be made such that a code is generated using a combination of two or more methods. An example of such a compromise is an extended quadratic congruential code generation approach that uses two 'independent' operators, where the first operator is linear and the second operator is quadratic. Accordingly, one, two, or more code generation schemes or combinations of such schemes can be employed to generate a code without departing from the scope of the invention.

Instead of employing a numerical code generation technique designed to produce codes with guaranteed correlation properties, a numerical code generation technique that produces pseudorandom codes can be used. A pseudorandom code can be generated using a computer's random number generator, binary shift-register(s) mapped to binary words, a chaotic code generation scheme, or another well-known technique. Such 'random-like' codes are attractive for certain applications since they tend to spread spectral energy over multiple frequencies while having 'good enough' correlation properties, whereas designed codes may have superior correlation properties but have spectral properties that may not be as suitable for a given application.

Computer random number generator functions commonly employ the linear congruential generation (LCG) method, which generates the n-th random number, $x_n$, from the previous random number, $x_{n-1}$, using an equation of the general form:

$$x_n = Ax_{n-1} + c \pmod{m}$$

where n identifies a given code in the generated code sequence, and the generated sequence is characterized by the multiplier A, the additive constant c, the modulus m, and an initial seed $x_0$. These random number generator functions can be referred to as $LCG(a,c,m,x_0)$, which determines the sequence generated.

Another method used for computer random number generator functions is the Additive Lagged-Fibonacci Generator (ALFG) method. This approach can be described by an equation of the form:

$$x_n = x_{n-j} + x_{n-k} \pmod{2^m}, j < k$$

where n identifies a given code in the generated code sequence, and j and k represent offsets to previously generated codes. The period of these generators is $(2^k - 1)2^{m-1}$ and they are referred to as $ALFG(l,k,m,x_0)$, which determines the sequence generated.

Binary shift-register pseudorandom number generators can be implemented in many different ways. One common approach is the linear feedback shift register illustrated in FIG. 13a. FIG. 13a illustrates an exemplary LCG shift register, including exclusive OR gate 1302 and registers 1304. The linear feedback shift register can be described by an equation of the form:

$$x_{n+k} = \sum_{i=0}^{k-1} a_i x_{n+i} \pmod{2}$$

where n identifies a given code in the generated code sequence, k is the number of bits in the shift register, $\alpha_i$ is the value of the i-th bit in the shift register. The sequence of bits that is generated depends on the initial shift-register state and which shift-register bit value, $a_i$, is fed back into the exclusive-OR device along with the shifted output.

The ALFG method can also be implemented using a shift register 1308 and a modulo adder 1306 device, as shown in FIG. 13b, which can be described by an equation of the form:

$$x_n = x_{n-j} + x_{n-k} \pmod{2}, j < k$$

where n identifies a given code in the generated code sequence, and j and k represent the shift-register bits fed into the modulo adder device.

Many other different but related traditional approaches for generating pseudorandom code sequences can also be employed, comprising inversive congruential generators, explicit-inversive congruential generators, multiple recursive generators, and combined LCGs. Any of these or other similar traditional methods, as known to skilled artisans, can be used to generate a pseudorandom code without departing from the scope of the invention.

In addition to the more traditional approaches described for generating pseudorandom codes, several other non-traditional approaches can be employed including chaotic code generators and Optimal Golomb Ruler (OGR) code generators. Any of these or other non-traditional methods can also be used to generate a pseudorandom code without departing from the scope of the invention.

Different methods of generating pseudorandom codes vary in the degree to which they approach true randomness. Additionally, variables, such as random number function seed values and initial states of shift-registers, determine where in the repeating number pattern that a given pseudorandom number or subsequence of numbers is retrieved. Consequently, the correlation and uniformity properties of a given generated pseudorandom code sequence can be difficult to predict and guarantee.

V. Mapping Code Elements to Pulse Positions

After two or more codes have been generated using one or more of the described numerical code generation techniques, the codes are used to map pulses to positions in time per the defined time period layout(s) and the employed code mapping approach. According to the present invention, pulse time positions are specified in accordance with a time layout that is subdivided into one or more time components. A first time-hopping code having pre-defined properties is mapped to a first time component and a second time-hopping code having pre-defined properties is mapped to a second time component. For example, a code having autocorrelation properties ideal for signal acquisition may be mapped to a first time component and a second code having cross-correlation properties ideal for channelization may be mapped to a second time component. Similarly, codes having different spectral properties can be combined, as can various combinations of codes with different autocorrelation properties, cross-correlation properties, and spectral properties. For example, various algebraic and pseudorandom numerical code generation techniques that are known to have certain correlation or spectral properties can be used with the present invention to generate codes.

Codes can be sequentially combined such that a code repeats until some event occurs, at which time another code repeats, etc. By using the sequential combination codes approach, the present invention supports multi-channel communications. Codes can also be nested such that one code specifies components within a value range layout and another code specifies discrete values within the components specified by the first code. In an exemplary embodiment, the use of a second nested pseudorandom code may improve spectral properties of algebraic codes. Furthermore, the sequential and nested combination code approaches can be combined such that acquisition and channelization are supported and spectral properties are greatly improved. Additionally, sequential combination codes, nested combination codes, and sequential nested combination codes can repeat.

The present invention supports various layout approaches including value range layouts, discrete value layouts, and combined value range/discrete value layouts. If codes of the same size are combined they can be mapped to a repeating layout. If codes having different sizes are combined, they can be mapped to layouts having different sizes that correspond to the different code sizes.

As described above, individual codes can map to components within a value range layout, to values within a value range layout, or can map to discrete values within components within a value range layout.

VI. Exemplary Transceiver Implementation

Transmitter

Figure 14:
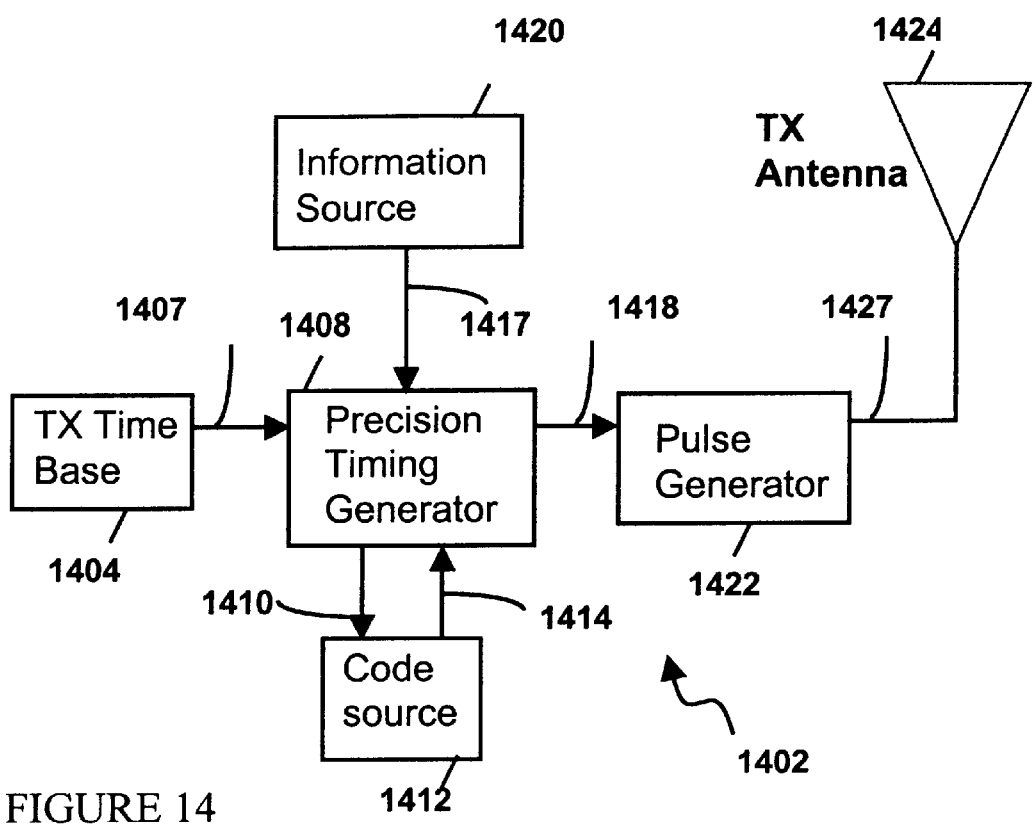
FIG. 14 is a block diagram of an impulse transmitter that advantageously uses the present invention.

Referring to FIG. 14, an exemplary embodiment of an impulse radio transmitter 1402 of an impulse radio communication system having one subcarrier channel that advantageously employs the above-described invention is shown.

The transmitter 1402 comprises a time base 1404 that generates a periodic timing signal 1407. The time base 1404 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 1407 is supplied to a precision timing generator 1408.

The precision timing generator 1408 supplies synchronizing signals 1410 to the code source 1412 and utilizes the code source output 1414 together with an internally generated subcarrier signal (which is optional) and an information signal 1417 to generate a modulated, coded timing signal 1418.

The code source 1412 comprises a storage device such as a random access memory (RAM), read only memory (ROM), or the like, for storing suitable time-hopping codes and for outputting the time-hopping codes as a code signal 1414. Alternatively, maximum length shift registers or other computational means can be used to generate the time-hopping codes.

An information source 1420 supplies the information signal 1417 to the precision timing generator 1408. The information signal 1417 can be any type of intelligence, including digital bits representing voice, data, imagery, or the like, analog signals, or complex signals.

Figure 15:
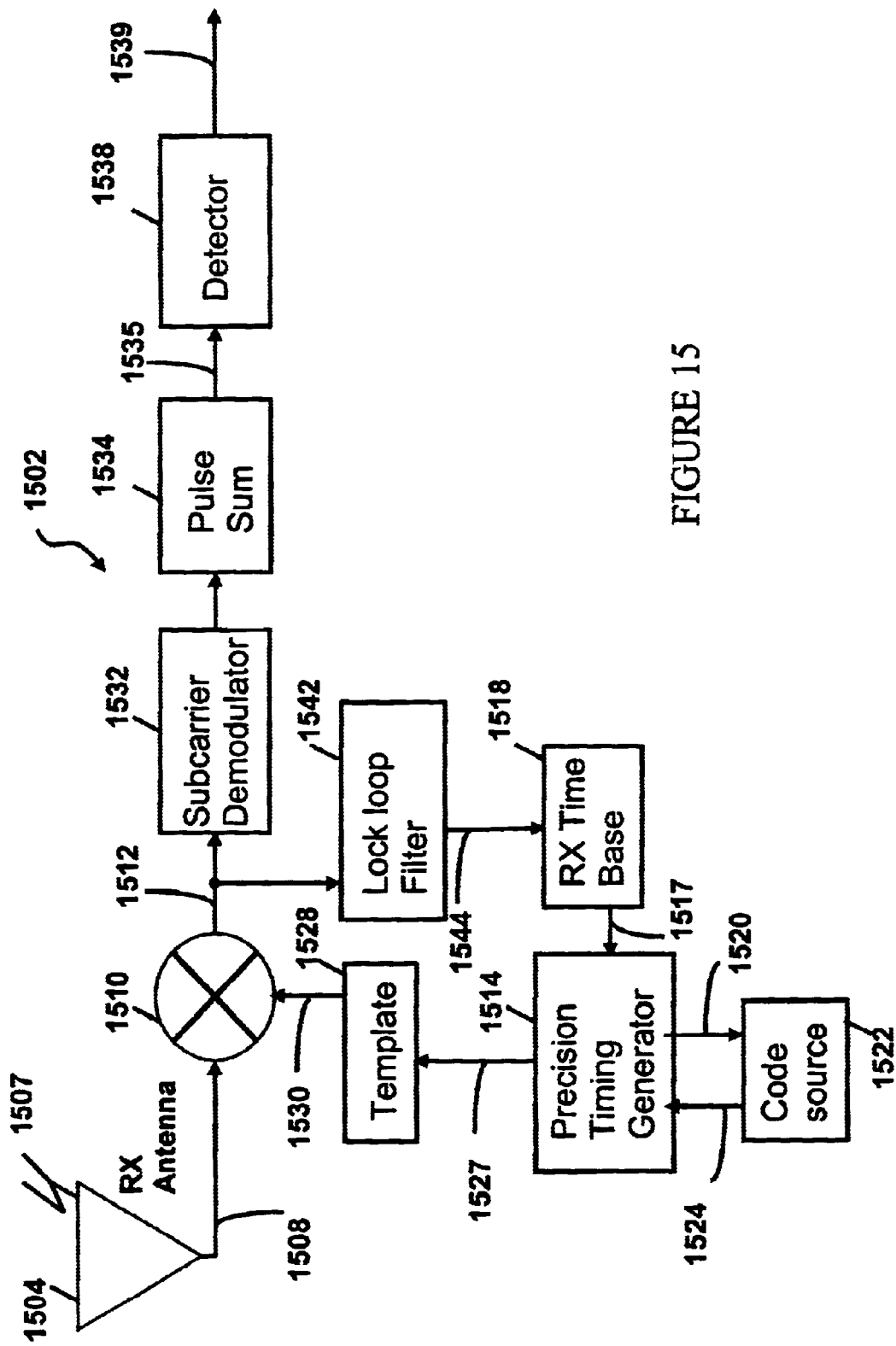
FIG. 15 is a block diagram of an impulse receiver that advantageously uses the present invention; and In the figures, like reference numbers generally indicate identical, functionally similar, and/or structurally similar elements. The figure in which an element first appears is indicated by the leftmost digit(s) in the reference number.

A pulse generator 1422 uses the modulated, coded timing signal 1418 as a trigger to generate output pulses. The output pulses are sent to a transmit antenna 1424 via a transmission line 1427 coupled thereto. The output pulses are converted into propagating electromagnetic pulses by the transmit antenna 1424. In the present embodiment, the electromagnetic pulses are called the emitted signal, and propagate to an impulse radio receiver 1502, such as shown in FIG. 15, through a propagation medium, such as air, in a radio frequency embodiment. In a preferred embodiment, the emitted signal is wide-band or ultrawide-band, approaching a monocycle pulse as in FIGS. 4 and 5.

However, the emitted signal can be spectrally modified by filtering of the pulses. This filtering will usually cause each monocycle pulse to have more zero crossings (more cycles) in the time domain. In this case, the impulse radio receiver can use a similar waveform as the template signal in the cross correlator for efficient conversion.

Receiver

FIG. 15 shows an exemplary embodiment of an impulse radio receiver 1502 (hereinafter called the receiver) for the impulse radio communication that may be used in connection with the present invention. More specifically, the system illustrated in FIG. 15 is for reception of digital data wherein one or more pulses are transmitted for each data bit.

The receiver 1502 comprises a receive antenna 1504 for receiving a propagated impulse radio signal 1507. A received signal 1508 from the receive antenna 1504 is coupled to a cross correlator or sampler 1510 to produce a baseband output 1512. The cross correlator or sampler 1510 includes multiply and integrate functions together with any necessary filters to optimize signal to noise ratio.

The receiver 1502 also includes a precision timing generator 1514, which receives a periodic timing signal 1517 from a receiver time base 1518. This time base 1518 is adjustable and controllable in time, frequency, or phase, as required by the lock loop in order to lock on the received signal 1508. The precision timing generator 1514 provides synchronizing signals 1520 to the code source 1522 and receives a code control signal 1524 from the code source 1522. The precision timing generator 1514 utilizes the periodic timing signal 1517 and code control signal 1524 to produce a coded timing signal 1527. The template generator 1528 is triggered by this coded timing signal 1527 and produces a train of template signal pulses 1530 ideally having waveforms substantially equivalent to each pulse of the received signal 1508. The code for receiving a given signal is the same code utilized by the originating transmitter 1402 to generate the propagated signal 1507. Thus, the timing of the template pulse train 1530 matches the timing of the received signal pulse train 1508, allowing the received signal 1508 to be synchronously sampled in the correlator 1510. The correlator 1510 ideally comprises a multiplier followed by a short-term integrator to sum the multiplier product over the pulse interval.

Further examples and details of correlation and sampling processes can be found in commonly owned patents U.S. Pat. Nos. 4,641,317, 4,743,906, 4,813,057, and 4,979,186, which are incorporated herein by reference, and commonly owned and co-pending application Ser. No. 09/356,384, filed Jul. 16, 1999, titled: "Baseband Signal Converter Device for a Wideband Impulse Radio Receiver," which is incorporated herein by reference.

The output of the correlator 1510, also called a baseband signal 1512, is coupled to a subcarrier demodulator 1532, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator 1532 is then filtered or integrated in a pulse summation stage 1534. The pulse summation stage produces an output representative of the sum of a number of pulse signals comprising a single data bit. The output of the pulse summation stage 1534 is then compared with a nominal zero (or reference) signal output in a detector stage 1538 to determine an output signal 1539 representing an estimate of the original information signal 1417.

The baseband signal 1512 is also input to a lowpass filter 1542 (also referred to as lock loop filter 1542). A control loop comprising the lowpass filter 1542, time base 1518, precision timing generator 1514, template generator 1528, and correlator 1510 is used to generate a filtered error signal 1544. The filtered error signal 1544 provides adjustments to the adjustable time base 1518 to time position the periodic timing signal 1527 in relation to the position of the received signal 1508.

In a transceiver embodiment, substantial economy can be achieved by sharing part or all of several of the functions of the transmitter 1402 and receiver 1502. Some of these include the time base 1518, precision timing generator 1514, code source 1522, antenna 1504, and the like.

VII. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of positioning pulses over time, comprising the steps of:

specifying pulse positioning over time in accordance with a time layout subdivided into at least a first time component and a second time component;

applying a first time-hopping code having first pre-defined properties in relation to said first time component; and applying a second time-hopping code having second pre-defined properties in relation to said second time component.

2. The method of claim 1, wherein said one or more time components are any one of:

a same size; and a different size, in relation to one another.

3. The method of claim 1, wherein said time layout is sequentially subdivided into at least a first time component and a second time component.

4. The method of claim 3, wherein said first and second subdivision time components are any one of:

a same size; and a different size, in relation to one another.

5. The method of claim 1, wherein said first pre-defined properties relate to a correlation property of the pulses.

6. The method of claim 5, wherein said correlation property is an auto-correlation property of the pulses.

7. The method of claim 5, wherein said correlation property is a cross-correlation property.

8. The method of claim 1, wherein said second pre-defined properties relate to a different correlation property that the first pre-defined properties.

9. The method of claim 8, wherein said different correlation property is an auto-correlation property.

10. The method of claim 8, wherein said different correlation property is a cross-correlation property.

11. The method of claim 1, wherein said second pre-defined properties relate to a spectral property.

12. The method of claim 1, wherein said first pre-defined properties relate to a spectral property, and wherein said second pre-defined properties relate to at least one of said spectral property and a different spectral property.

13. The method of claim 1, wherein said first time-hopping code is generated using a numerical code generation technique with desirable autocorrelation properties.

14. The method of claim 13, wherein said numerical code generation technique comprises at least one of:

a Welch-Costas Array code generation technique;

a Golomb-Costas Array code generation technique; and a Hyperbolic Congruential code generation technique.

15. The method of claim 1, wherein said second time-hopping code is generated using a numerical code generation technique with desirable cross-correlation properties.

16. The method of claim 15, wherein said numerical code generation technique comprises at least one of:

a Quadratic Congruential code generation technique;

a Linear Congruential code generation technique; and a Hyperbolic Congruential code generation technique.

17. The method of claim 1, wherein at least one of said first and said second time-hopping codes is generated using a numerical code generation technique with desirable spectral properties.

18. The method of claim 17, wherein said numerical code generation technique comprises at least one of:
   linear congruential pseudorandom number generator technique;
   additive lagged-Fibonacci pseudorandom number generator technique;
   linear feedback shift register pseudorandom number generator technique;
   lagged-Fibonacci shift register pseudorandom number generator technique;
   chaotic code pseudorandom number generator technique; and
   optimal Golomb ruler code pseudorandom number generator technique.

19. The method of claim 1, wherein said first time-hopping code specifies a partition within a value range layout, and
   wherein said second time-hopping code specifies a range value within said partition.

20. The method of claim 19, wherein said partition is any one of:
   a frame;
   a subcomponent of a frame; and
   any smaller component of a subcomponent of a frame.

21. The method of claim 1, wherein said first time-hopping code specifies a partition within a value range layout, and
   wherein said second time-hopping code specifies a discrete value within said partition.

22. The method of claim 21, wherein said partition is any one of:
   a frame;
   a subcomponent of a frame; and
   any smaller component of a subcomponent of a frame.

23. The method of claim 21, wherein said first time-hopping code is generated using a numerical code generation technique with desirable auto-correlation properties.

24. The method of claim 23, wherein said numerical code generation technique comprises at least one of:
   a Welch-Costas code generation technique;
   a Golomb-Costas code generation technique;
   a Quadratic Congruential code generation technique;
   a Linear Congruential code generation technique; and
   a Hyperbolic Congruential code generation technique.

25. The method of claim 21, wherein said second time-hopping code is generated using a numerical code generation technique with desirable spectral properties.

26. The method of claim 25, wherein said numerical code generation technique comprises at least one of:
   linear congruential pseudorandom number generator technique;
   additive lagged-Fibonacci pseudorandom number generator technique;
   linear feedback shift register pseudorandom number generator technique;
   lagged-Fibonacci shift register pseudorandom number generator technique;
   chaotic code pseudorandom number generator technique; and
   optimal Golomb ruler code pseudorandom number generator technique.

27. The method of claim 1, wherein said first time-hopping code specifying a positioning of the pulses is repeated until an event occurs, whereupon said second time-hopping code is repeated to specify another positioning of the pulses.

28. The method of claim 27, wherein the first time-hopping code is any one of:
   a Welch-Costas code;
   a Golomb-Costas code; and
   a Hyperbolic Congruential code.

29. The method of claim 27, wherein the said event is signal acquisition.

30. The method of claim 27, wherein the second time-hopping code is any one of:
   a Quadratic Congruential code;
   a Linear Congruential code; and
   a Hyperbolic Congruential code.

31. The method of claim 1, wherein a combination comprising said first time-hopping code specifying a positioning of the pulses and said second time-hopping code specifying a second positioning of the pulses is repeated.

32. An impulse transmission system comprising:
   a Time Modulated Ultra Wideband Transmitter;
   a Time Modulated Ultra Wideband Receiver; and said Time Modulated Ultra Wideband Transmitter and said Time Modulated Ultra Wideband Receiver employ at least a first and second time-hopping code, wherein said first and second time-hopping codes specify pulse positioning over time in accordance with a time layout subdivided into at least a first and second time component, said first time-hopping code having first pre-defined properties is applied to said first time component, and said second time-hopping code having second pre-defined properties is applied to said second time component.

33. The impulse transmission system of claim 32, wherein said one or more time components are any one of:
   a same size; and
   a different size, in relation to one another.

34. The impulse transmission system of claim 32, wherein said time layout is sequentially subdivided into at least a first time component and a second time component.

35. The impulse transmission system of claim 34, wherein said first and second subdivision time components are any one of:
   a same size; and
   a different size, in relation to one another.

36. The impulse transmission system of claim 32, wherein said first pre-defined properties relate to a correlation property of the pulses.

37. The impulse transmission system of claim 36, wherein said correlation property is an auto-correlation property of the pulses.

38. The impulse transmission system of claim 36, wherein said correlation property is a cross-correlation property.

39. The impulse transmission system of claim 32, wherein said second pre-defined properties relate to a different correlation property.

40. The impulse transmission system of claim 39, wherein said different correlation property is an auto-correlation property.

41. The impulse transmission system of claim 39, wherein said different correlation property is a cross-correlation property.

42. The impulse transmission system of claim 32, wherein said second pre-defined properties relate to a spectral property.

43. The impulse transmission system of claim 32, wherein said first pre-defined properties relate to a spectral property, and wherein said second pre-defined properties relate to at least one of said spectral property and a different spectral property.

44. The impulse transmission system of claim 32, wherein said first time-hopping code is generated using a numerical code generation technique with desirable autocorrelation properties.

45. The impulse transmission system of claim 44, wherein said numerical code generation technique comprises at least one of:

a Welch-Costas Array code generation technique;

a Golomb-Costas Array code generation technique; and a Hyperbolic Congruential code generation technique.

46. The impulse transmission system of claim 32, wherein said second time-hopping code is generated using a numerical code generation technique with desirable cross-correlation properties.

47. The impulse transmission system of claim 46, wherein said numerical code generation technique comprises at least one of:

a Quadratic Congruential code generation technique;

a Linear Congruential code generation technique; and a Hyperbolic Congruential code generation technique.

48. The impulse transmission system of claim 32, wherein at least one of said first and said second time-hopping codes is generated using a numerical code generation technique with desirable spectral properties.

49. The impulse transmission system of claim 48, wherein said numerical code generation technique comprises at least one of:

linear congruential pseudorandom number generator technique;

additive lagged-Fibonacci pseudorandom number generator technique;

linear feedback shift register pseudorandom number generator technique;

lagged-Fibonacci shift register pseudorandom number generator technique;

chaotic code pseudorandom number generator technique; and optimal Golomb ruler code pseudorandom number generator technique.

50. The impulse transmission system of claim 32, wherein said first time-hopping code specifies a partition within a value range layout, and wherein said second time-hopping code specifies a range value within said partition.

51. The impulse transmission system of claim 50, wherein said partition is any one of:

a frame;

a subcomponent of a frame; and any smaller component of a subcomponent of a frame.

52. The impulse transmission system of claim 32, wherein said first time-hopping code specifies a partition within a value range layout, and wherein said second time-hopping code specifies a discrete value within said partition.

53. The impulse transmission system of claim 52, wherein said partition is any one of:

a frame;

a subcomponent of a frame; and any smaller component of a subcomponent of a frame.

54. The impulse transmission system of claim 52, wherein said first time-hopping code is generated using a numerical code generation technique with desirable auto-correlation properties.

55. The impulse transmission system of claim 54, wherein said numerical code generation technique comprises at least one of:

a Welch-Costas code generation technique;

a Golomb-Costas code generation technique;

a Quadratic Congruential code generation technique;

a Linear Congruential code generation technique; and a Hyperbolic Congruential code generation technique.

56. The impulse transmission system of claim 52, wherein said second time-hopping code is generated using a numerical code generation technique with desirable spectral properties.

57. The impulse transmission system of claim 56, wherein said numerical code generation technique comprises at least one of:

linear congruential pseudorandom number generator technique;

additive lagged-Fibonacci pseudorandom number generator technique;

linear feedback shift register pseudorandom number generator technique;

lagged-Fibonacci shift register pseudorandom number generator technique;

chaotic code pseudorandom number generator technique; and optimal Golomb ruler code pseudorandom number generator technique.

58. The impulse transmission system of claim 32, wherein said first time-hopping code specifying a positioning of the pulses is repeated until an event occurs, whereupon said second time-hopping code is repeated to specify another positioning of the pulses.

59. The impulse transmission system of claim 58, wherein the first time-hopping code is any one of:

a Welch-Costas code;

a Golomb-Costas code; and a Hyperbolic Congruential code.

60. The impulse transmission system of claim 58, wherein the said event is signal acquisition.

61. The impulse transmission system of claim 58, wherein the second time-hopping code is any one of:

a Quadratic Congruential code;

a Linear Congruential code; and a Hyperbolic Congruential code.

62. The impulse transmission system of claim 32, wherein a combination comprising said first time-hopping code specifying a positioning of the pulses and said second time-hopping code specifying a second positioning of the pulses is repeated.

* * * * *